Oct. 29, 1968    L. W. WELLS    3,408,019
FILM CARTRIDGE
Filed March 24, 1966    2 Sheets-Sheet 1
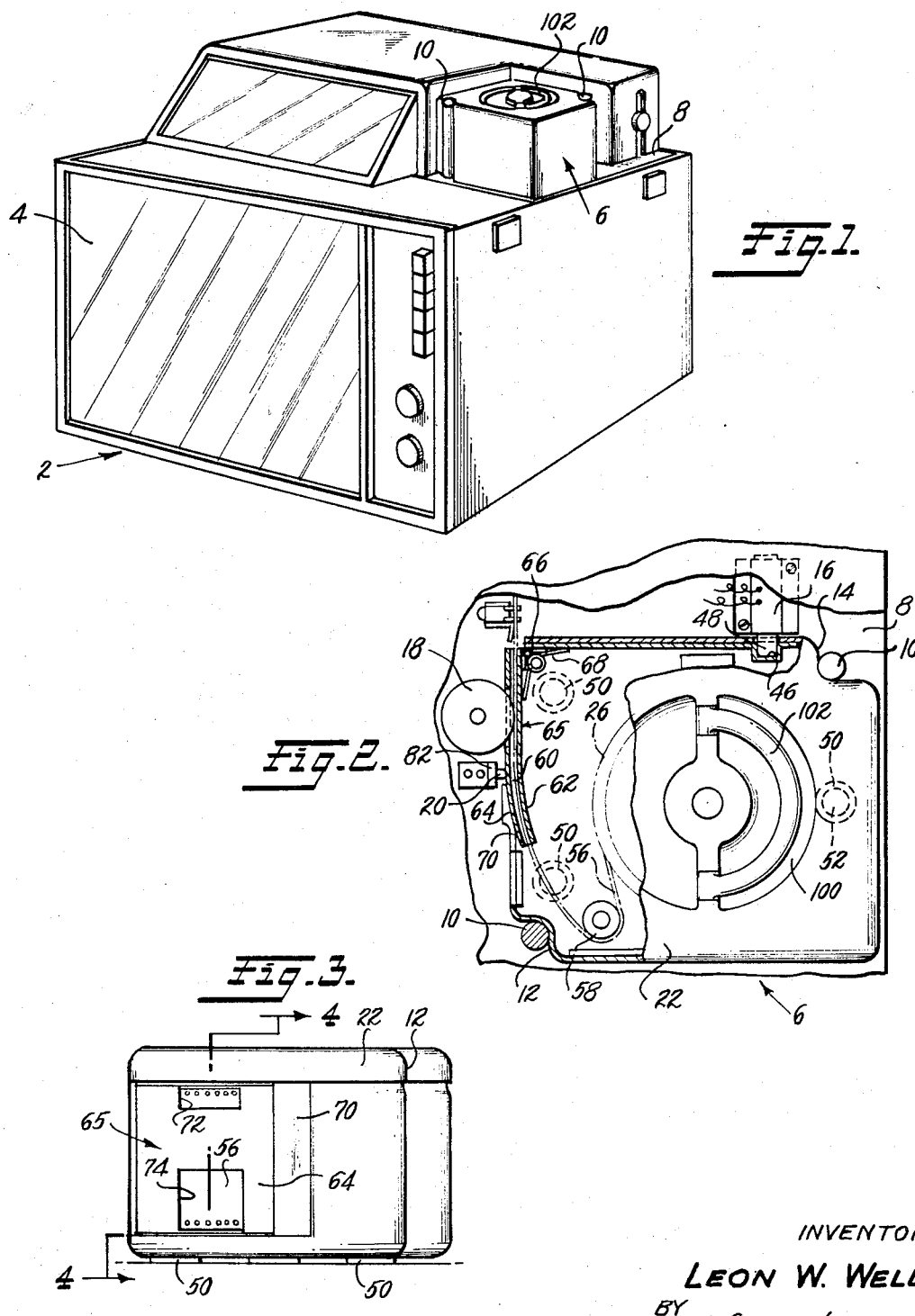
INVENTOR
LEON W. WELLS
BY
Lyon & Lyon
ATTORNEYS Oct. 29, 1968    L. W. WELLS    3,408,019
FILM CARTRIDGE
Filed March 24, 1966    2 Sheets-Sheet 2
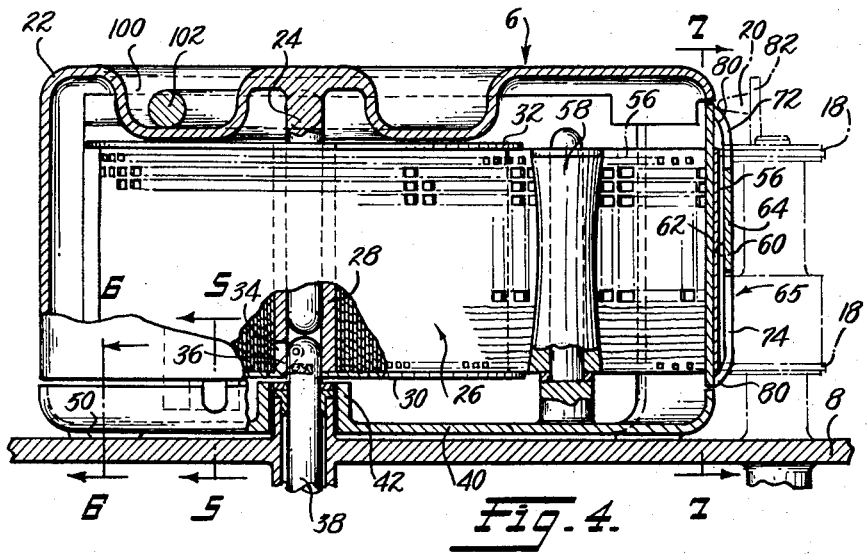
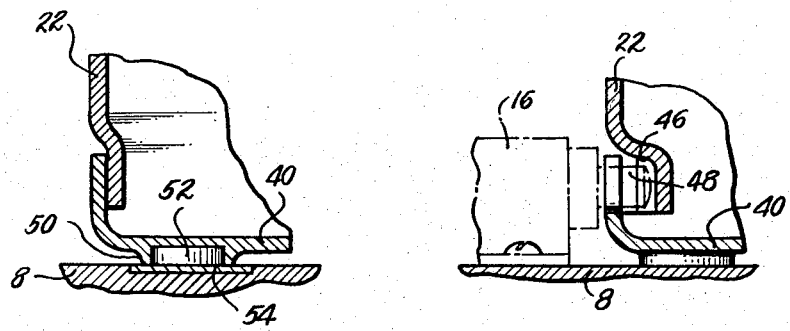
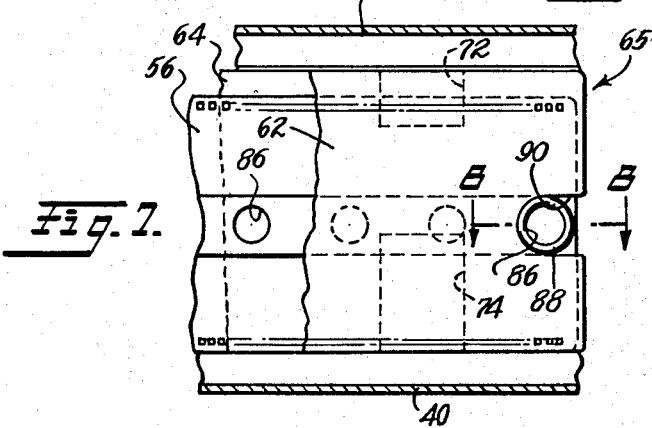
INVENTOR.
LEON W. WELLS
BY
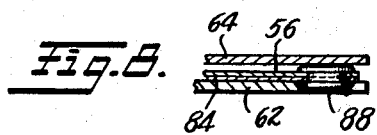
ATTORNEYS United States Patent Office 3,408,019
Patented Oct. 29, 1968

3,408,019
FILM CARTRIDGE
Leon W. Wells, Closter, N.J., assignor to Panopix Research Inc., New York, N.Y., a corporation of New York
Filed Mar. 24, 1966, Ser. No. 537,229
3 Claims. (Cl. 242—71.1)

ABSTRACT OF THE DISCLOSURE

A film cartridge for a projector where the film is stored on a single reel in the cartridge and has the end portion of the film threaded from the reel over an internally mounted guide roller and then into and through a pivotally mounted gate forming a film guiding channel with openings in the gate through which a drive roller on the projector will engage and advance the film.

---

This invention relates to a film cartridge, particularly for use with the projection machine described and claimed in applicant's copending application Ser. No. 541,196, filed on Apr. 8, 1966. While the following description relates to a cartridge particularly adapted for use with the projection machine of the copending application, it is to be understood that the same is not limited thereto but is adapted for use with projection machines having other features and characteristics.

The cartridge of the present invention is intended for use with film on which a multiplicity of rows of picture frames and sound tracks are printed and wherein the film is projected by running the same alternately in opposite directions to project successive rows of picture frames therefrom whereby an unusually long show may be contained on a single roll of film of relatively small diameter, the film may be of about 70 mm. width. The cartridge is shown and described with reference to a reel of film having picture frames and sound tracks thereon but it is to be understood that it is also adapted for use with film containing only a multiplicity of sound tracks without any pictures.

In brief, the invention comprises a cartridge casing in which a reel of film is mounted, the cartridge having means for guiding it to a predetermined position on a projection machine and for holding the same there against the possibility of removal during the entire projection cycle. The end of the film is always maintained in proper position to be engaged by self-threading means on the projection means and, as will become apparent from the following description, all the operator needs do is position the cartridge on the machine and start the latter whereupon the film is automatically threaded, projected and finally rewound in the cartridge, whereupon the latter may be simply removed from the machine without further manipulation.

It is, therefore, a principal object of this invention to provide a novel cartridge and reel structure adapted to hold a reel of wide film for placement on a projection machine and wherein no other manipulation is necessary to prepare the apparatus for projection of the material recorded on the film.

Other objects and advantages will become apparent to those skilled in the art as the description proceeds with reference to the accompanying drawings wherein:

FIG. 1 is a perspective schematic view of the cartridge of the present invention in place on one type of projection machine;

FIG. 2 is an enlarged plan view of the cartridge of FIG. 1, parts thereof being broken away, and showing portions of the projection machine;

FIG. 3 is a side elevational view of the cartridge of FIG. 2, as seen from the left side thereof;

FIG. 4 is an enlarged vertical sectional view taken substantially along the line 4—4 of FIG. 3, and showing related portions of the projection machine.

FIG. 5 is an enlarged fragmentary sectional view taken on the line 5—5 of FIG. 4;

FIG. 6 is an enlarged fragmentary sectional view taken on the line 6—6 of FIG. 4;

FIG. 7 is an enlarged fragmentary sectional view taken on the line 7—7 of FIG. 4; and FIG. 8 is a sectional view taken on the line 8—8 of FIG. 7.

Referring first to FIG. 1, numeral 2 indicates generally the projection machine fully described in the copending application previously referred to and it includes a translucent screen 4, on the rear face of which pictures from the film are projected. The film cartridge 6 is positioned on a vertically movable platform 8 and moves therewith while film is withdrawn from and then rewound into the cartridge, all in the manner described in the copending application. As seen in FIGS. 1 and 2, the platform 8 is provided with upstanding locating pins 10 engageable in notches 12 and 14 in opposite corners of the cartridge 6. It is to be noted that the notch 14 is deeper in one direction than is the notch 12 and thus the cartridge can be placed on the platform 8 in only the one position shown. Also mounted on the platform 8 is an electrically operated latch device 16 (FIG. 2) whereby the cartridge is securely locked in place on the platform 8 while the machine is in operation and in a projecting cycle. At the completion of a cycle and withdrawal of the film back to the cartridge, the latch 16 is automatically released whereby the cartridge may be lifted from the platform. This feature is fully described in the copending application referred to. The projection machine also includes a friction feed roller device 18 and a cam finger 20, both of which were fully described in the copending application, but a brief description thereof will be repeated later herein.

The cartridge 6 comprises a closed casing 22 which may be of any desired material and which may be made in any number of parts desired other than the two-part casing shown. The top wall of the casing 22 is provided with a downwardly extending spindle 24 (see FIG. 4) on which a reel 26 of film 56 is journalled. The reel 26 comprises a hub portion 28 of tubular construction and end flanges 30 and 32. The hub portion 28 projects downwardly below the lower end of the spindle 24 and is provided with means such as the notch 34 for engagement with a pawl 36 on a drive shaft 38 journalled in the platform 8. The lower or bottom wall 40 of the cartridge 6 is provided with a hollow guide boss 42 axially aligned with the spindle 24 and serving to guide the bushing 44, in which shaft 38 is journalled, to a position wherein the pawl 36 engages notch 34 to establish a driving connection between the shaft 38 and the reel 26. Thus, it can be seen that the mere placement of the cartridge 6 on the projection machine results in establishing a drive connection between shaft 38 and reel 26.

As shown in greater detail in FIG. 5, a side wall of the cartridge, near the bottom wall 40, is provided with structure defining a notch 46 in which the movable latch element 48 of latch device 16 is projected to lock the cartridge in place in the manner described.

The cartridge 6 is also provided with a plurality of feet 50 (see FIG. 6) on its bottom wall 40 in which are embedded permanent magnets 52. The platform 8, constituting a part of the projection machine, is preferably of lightweight material, such as aluminum, although it may be made of ferromagnetic material. In the event it is constructed of aluminum or other nonmagnetic material, as in the embodiment illustrated, ferromagnetic inserts 54 are provided therein to assist in holding the cartridge 6 in fixed position on the platform even though a reel of film is only partly filled and thus of relatively light weight.

The reel 26 has wound thereon a length of film 56, directed from the reel in the manner shown, about a guide roller 58 journalled in the cartridge 6. One wall of the cartridge defines a channel 60 through which the film 56 slidably extends for passage to the exterior of the cartridge 7 and through the operating mechanism of the projection machine. The guide roller 58 is so positioned that it guides the film 56 directly into the channel 60 since a peripheral portion of the roller 58 is substantially in alignment with the longitudinal center line of the channel 60 (see FIG. 2), irrespective of the diameter of the roll of film on reel 26. As is obvious, the diameter of the roll of film changes from maximum to minimum during projection of one row of picture frames and then increases from minimum to a maximum during projection of the next adjacent row of picture frames, since the film is sequentially run in opposite directions.

The channel 60 is defined by an inner wall 62 (see FIGS. 2 and 4) and an outer wall 64 secured in fixed relation to each other to define the channel 60 therebetween. The walls 62 and 64 further constitute a gate 65 hinged to the casing 22 at one corner thereof, on a hinge axis 66. Suitable spring means 68 constantly urge the gate to swing outwardly to a position where it is substantially flush with a side of the cartridge casing, suitable stop means 70 being provided to define the outermost position of the swinging gate. The outer wall 64 of the gate is further provided with cutouts or openings 72 and 74 (see also FIG. 3) exposing opposite edge portions of the interior of channel 60. As is apparent from FIGS. 3 and 7, the edges of the film 56 in the channel 60 are exposed in the openings 72 and 74 where they are engageable by the friction roller means 18, previously referred to. It is to be noted that the peripheries of the friction roller means 18 project into the openings 72 and 74 and thus would normally interfere with removal of the cartridge 6 from the projection machine and with its placement thereon. However, the upper and lower edge portions of the outer wall 64 are curved inwardly to define cam surfaces 80. A post 82 on the platform 8 adjacent the roller means 18 supports the cam finger 20, previously referred to, and the latter is so positioned and dimensioned that when the cartridge is in position on the projection machine, the film gate can swing outwardly to press the film 56 into engagement with the friction roller devices 18. However, when the cartridge 6 is lifted vertically off the platform 8, the finger 20 engages the upper cam surface 80 and swings the free end of the gate inwardly a sufficient distance so that outer wall 64 will be clear of the periphery of the friction device 18 and the outer wall will be held in that inner position until the cartridge has been removed. When positioning the cartridge on the machine, it is to be remembered that the notches 12 and 14 are first engaged with the upper ends of the guide pins 10 and the cartridge is then slid downwardly. At the start of that downward movement that cam finger 20 engages the lower cam surface to swing the film gate inwardly and thus move the outer wall 64 to an inner position clear of the friction rollers 18 and is not released for outward swinging movement to the position of FIG. 4 until the cartridge is in position on platfrm 8 and finger 20 has passed upwardly over the upper cam surface 80, to the position shown in FIG. 4.

As fully described in the copending application referred to, the film 56 is provided with a leader portion having a reinforcing band 84 (see FIG. 7) extending along the central line thereof. The reinforcing band 84 is provided with openings 86 therein and for the purpose fully described in the earlier application. The endmost opening 86, however, is preferably defined by an eyelet 88 of greater thickness than the film and the reinforcing band. Thus, the eyelet projects from at least one face of the film. As shown in FIG. 7, the inner wall 62 of the film guiding gate 65 is provided with a notch 90 of sufficient width and depth to accommodate the eyelet 86.

The earlier application referred to describes the rewinding of the film 56 in the cartridge after completion of the projection thereof. In the event the rewinding mechanism tends to overrun or to coast after its driving energy is removed, it might tend to cause the reel 26 to rotate sufficiently to withdraw the film completely into the cartridge without leaving portions thereof exposed in the openings 72 and 74 for subsequent automatic rethreading when the cartridge is later placed on a projection machine. The eyelet 88 and notch 90 are provided to prevent such complete retraction of the film. As is evident from FIGS. 7 and 8, withdrawal of the film to the point where eyelet 88 is seated in the notch 60 forcibly stops the film at that position and it is then ready for subsequent automatic rethreading.

As can be seen from FIGS. 2 and 4, the top wall of the cartridge casing 22 is provided with an annular depression 100 of a size and shape to receive a substantially semicircular pivoted handle 102. The handle 102 serves for carrying and manipulating the cartridge 6 but can be swung to the housed position shown in FIG. 4 wherein it will not interfere with the stacking of cartridges one upon the other or project therefrom to interfere with operation of the projection machine.

While a single specific embodiment of the invention has been shown and described herein, it is to be understood that the same is merely exemplary and that other modifications may be resorted to within the scope of the appended claims.

I claim:

1. A film cartridge comprising: a hollow casing; spindle means in said casing for rotatably supporting a film reel therein; a gate pivotally mounted on said casing; said gate having an inner and an outer wall defining a film guiding channel for guiding film from the interior to the exterior of said casing; said outer wall having openings therethrough, at opposite edges of said channel for engagement of external roller means with edge portions of film in said channel; a guide roller in said casing arranged to guide film from a reel on said spindle to the inner end of said channel, said roller having a peripheral portion in substantial alignment with said channel; and the pivotal axis of said gate being at the outer end of said channel and parallel to the axis of said guide roller.

2. A film cartridge as defined in claim 1 wherein said outer wall is configured to define cam surfaces adjacent said openings whereby external camming means may swing said gate inwardly of said casing upon relative movement between said cartridge and said external camming means.

3. The film cartridge of claim 1 having biasing means engaging and urging said gate to swing to an outer portion substantially flush with the exterior side wall of said casing.

References Cited

UNITED STATES PATENTS

| | | |
|---|---|---|
| 959,601 | 5/1910 | Power. |
| 1,623,505 | 4/1927 | Tessier _____ 242—71.1 X |
| 1,685,010 | 9/1928 | Thornton _____ 242—71.1 |
| 2,505,783 | 5/1950 | Mellert _____ 242—55.13 |
| 2,578,283 | 12/1951 | Bornemann et al. __ 242—71.1 X |
| 2,755,030 | 7/1956 | D'Ornellas _____ 242—55.11 |
| 3,090,574 | 5/1963 | Doncaster et al. ____ 242—55.13 |
| 3,188,014 | 6/1965 | Vergin _____ 242—55.13 |
| 3,190,575 | 6/1965 | Hayner et al. _____ 242—55.13 |
| 3,190,577 | 6/1965 | Allen et al. _____ 242—71.1 |
| 3,317,151 | 5/1967 | Wright _____ 242—71.1 X |

GEORGE F. MAUTZ, *Primary Examiner.*